United States Patent [19]

Ohara et al.

[11] Patent Number: 5,560,469
[45] Date of Patent: Oct. 1, 1996

[54] APPARATUS FOR POSITIONING A FLOATING HANGER

[75] Inventors: Yasunari Ohara, Kakogawa; Shigehiko Harada, Daito, both of Japan

[73] Assignee: Tsubakimoto Chain Co., Osaki, Japan

[21] Appl. No.: 506,697

[22] Filed: Jul. 25, 1995

[30] Foreign Application Priority Data

Jul. 27, 1994 [JP] Japan .................................. 6-193861

[51] Int. Cl.⁶ ................................................. B65G 47/22
[52] U.S. Cl. ........................................................ 198/345.1
[58] Field of Search ............................... 198/343.2, 345.1, 198/345.2, 345.3, 346.3, 468.9, 678.1, 687.1

[56] References Cited

U.S. PATENT DOCUMENTS 4,924,996  5/1990  Svensson et al. ................ 198/345.1 X
5,413,204  5/1995  Mori et al. ........................... 198/345.1
5,474,166  12/1995  Santandrea et al. ................ 198/345.3

FOREIGN PATENT DOCUMENTS 61-142028  6/1986  Japan .
62-173319  11/1987  Japan .

Primary Examiner—James R. Bidwell
Attorney, Agent, or Firm—Armstrong, Westerman, Hattori, McLeland & Naughton

[57] ABSTRACT

The present invention provides an apparatus for positioning a floating hanger, wherein a hanger rod, elongated vertically has a cone portion formed at a lower end portion thereof and is mounted on a carrier. A hanger frame, on which a number of gripping elements for gripping a conveyor goods are mounted, is hung from the hanger rod. The gripping elements are capable of moving with respect to each other such that the spacing therebetween may be changed.

1 Claim, 5 Drawing Sheets

APPARATUS FOR POSITIONING A FLOATING HANGER

FIELD OF THE INVENTION

The present invention relates generally to a hanger for hanging conveyance goods and more particularly, to an apparatus for positioning a floating hanger, wherein the apparatus corrects a deviation, for example, in the direction of the conveyance of the goods or perpendicular to the conveying direction of the position of the goods being conveyed with a hanger to a deviated position other than the predetermined position.

BACKGROUND OF THE INVENTION

A well known type of carrier (not shown) includes a hanger hung thereon, such that the hanger has a grip means for gripping conveyor goods. Such a hanger, am shown in prior art FIG. 6, goes down from right above the conveyor goods W which have been conveyed in the direction of the arrow A using a conveyor device (i.e., conveyor 10, as shown in FIG. 6), and then grips and suspends the conveyor goods by the gripping elements.

Such a conventional hanger has the following problems: normally, it is required that the conveyor goods W conveyed by the conveyor 10 abut the fixed stopper S, rebound thereupon and stop at a predetermined position as shown by the solid lines of FIG. 6. However, it sometimes happens that the rebounded conveyor 10 stops at a deviated position as illustrated by the phantom or dashed lines of FIG. 6.

In the latter case, it often happens that the gripping elements cannot grip the conveyor goods W even if the carrier stops at a predetermined position. Even if the gripping elements could grip the conveyor goods W, the hanger would suspend the conveyor goods W, with a deviated position relative to the correct positioning of the conveyor goods W.

Accordingly, even if the conveyor goods W could be transported by the carrier to their destinations, they would be discharged at a place deviating from the predetermined position. This could create serious problems such as in the case of conveyor goods W like a car body being assembled on the assembly lines at an automobile manufacturing plant wherein the deviated position of the car body would reek havoc with the assemblage of the car.

SUMMARY OF THE INVENTION

The preferred embodiment of the present invention provides an apparatus for positioning a floating hanger which includes: a hanger rod elongated vertically and mounted on a carrier which runs on a rail, the hanger rod having a cone portion formed at a lower end thereof; a hanger frame hung from the hanger rod; a number of gripping elements mounted on the hanger frame for gripping a conveyor goods, the gripping elements being movable with respect to each other so as to change the spacing therebetween; a receiving bore formed at the hanger frame for engaging a circular cone of the cone portion therewith such that the hanger rod is loosely fit into the hanger frame; a regulation rod mounted on the carrier and elongated downward therefrom; a slot formed at the hanger frame for boring the regulation rod therethrough and abutting against an outer periphery of the regulation rod thereby allowing the hanger frame to move in one direction and rotate about the regulation red in a horizontal plane; and a sliding member mounted on a lower surface of the hanger frame and being movable in the same direction as the hanger frame such that the sliding member abuts the conveyor goods which is lifted up.

According to the apparatus for positioning a floating hanger of the present invention, the carrier stops at the predetermined position right above the position that the conveyor goods are carried in and makes the gripping elements open. In the present invention, the receiving bore of the hanger frame is engaged with the cone portion of the hanger rod so that the hanger frame is suspended by the hanger rod in a locked condition.

The conveyor goods, transported to the carry-in position, are raised by an elevator even though there is a deviation from the predetermined position.

When the rising conveyor goods being raised by the elevator abut the sliding member, the conveyor goods then push up the hanger frame and raise the receiving bore from the cone portion, so that the hanger frame is placed in a floating condition.

The elevator stops the conveyor goods from going up, when the receiving bore is lifted from the cone portion. In other words, the conveyor goods stop at the position at which the hanger frame is pushed up enough to be in a floating condition.

Even though both the carrier and the hanger frame stop at the predetermined position, the conveyor goods are carried in a position which is deviated from the predetermined position, resulting in the hanger frame and the conveyor goods being deviated with respect to each other.

When the gripping elements grip the conveyor goods, the hanger frame moves in one direction on the conveyor via the sliding member which is movably mounted on a lower surface of the hanger frame while rotating thereon about the regulation rod. The loose fit of the hanger rod in the receiving bore which is apart from the cone portion and the engagement of the regulation rod with the slot allows the hanger frame to move and rotate relative to the carrier. In this way, the gripping elements grip the conveyor goods surely and the frame can be adjusted to the appropriate position relative to the conveyor goods.

When the elevator descends with the hanger frame floating, the conveyor goods and the hanger frame supported by the elevator, descend until the receiving bore is supported by the cone portion and at which point the conveyor goods and hanger frame stop. Subsequently, only the elevator continues to descend and stops at the height at which it can lift the following conveyor to be transported.

When the receiving bore of the hanger frame is caught by the cone portion and the descent of the hanger frame is stopped, the receiving bore, guided by a circular cone, corrects the position deviation of the hanger frame so that the receiving bore is centered on the predetermined position. Accordingly, the hanger is positioned with respect to the carrier.

DETAILED DESCRIPTION OF THE PREFERRED EMBODIMENT

Figure 1:
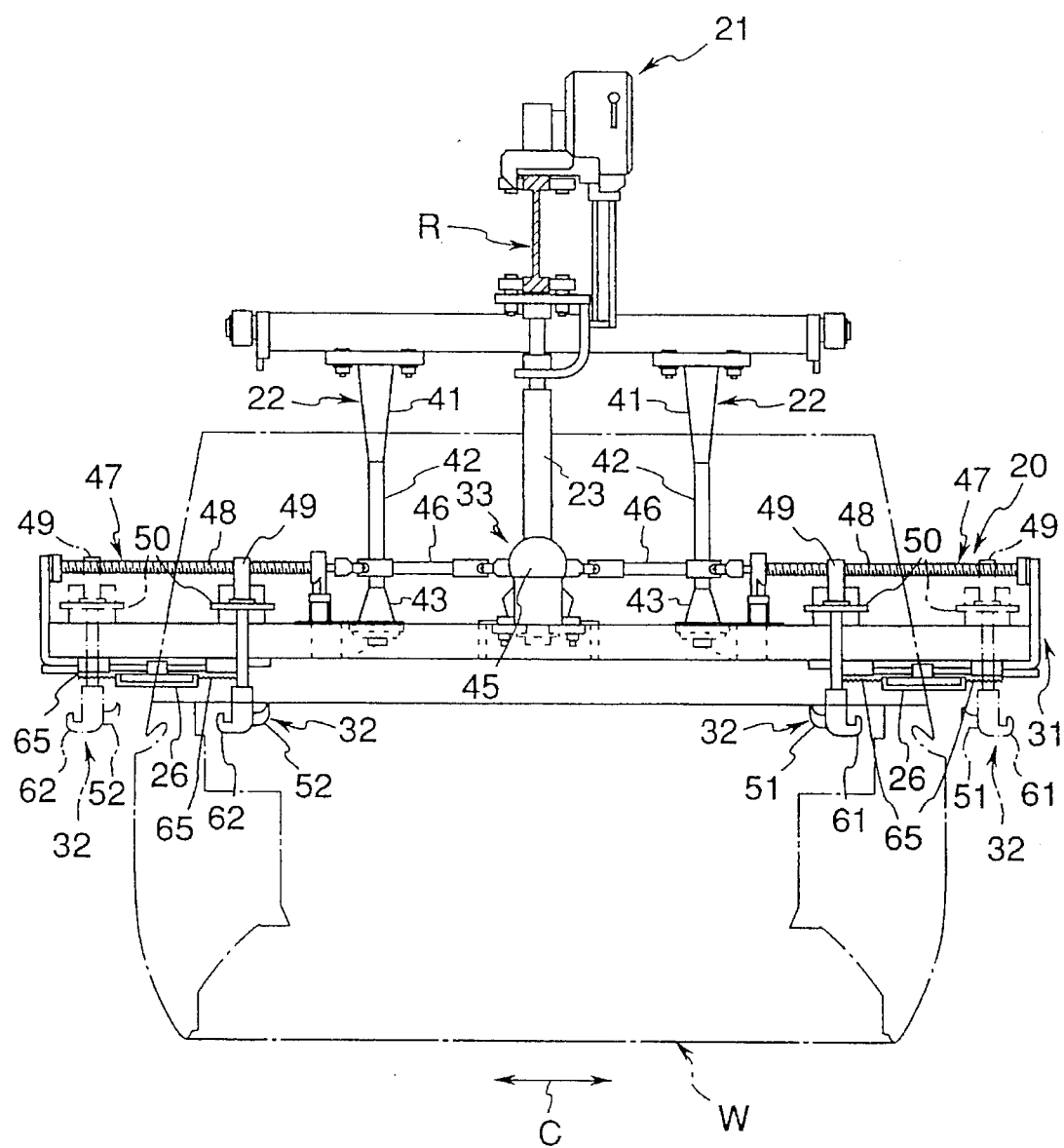
FIG. 1 is a front view of one embodiment of one carrier having an apparatus for positioning a floating hanger according to the present invention.

The preferred embodiment of the present invention will now be described in detail with reference to the accompanying FIGS. 1 to 5. A hanger 20 comprises a hanger frame 31 which is mounted by four hanger rods 22 through plates attached to the hanger frame 31, on a carrier 21 running on a rail R, and a number of gripping elements which are supported on the hanger frame.

A regulation rod 23, elongated in a vertical direction, is mounted on the carrier 21. The hanger rod includes a large radius end portion formed at an upper end mounting portion thereof, a small radius portion formed at an intermediate portion thereof, and a cone portion, broadening toward a lower end and formed at a lower end portion thereof, wherein the maximum diameter of the cone portion is more than the diameter of the small radius portion.

Figure 2:
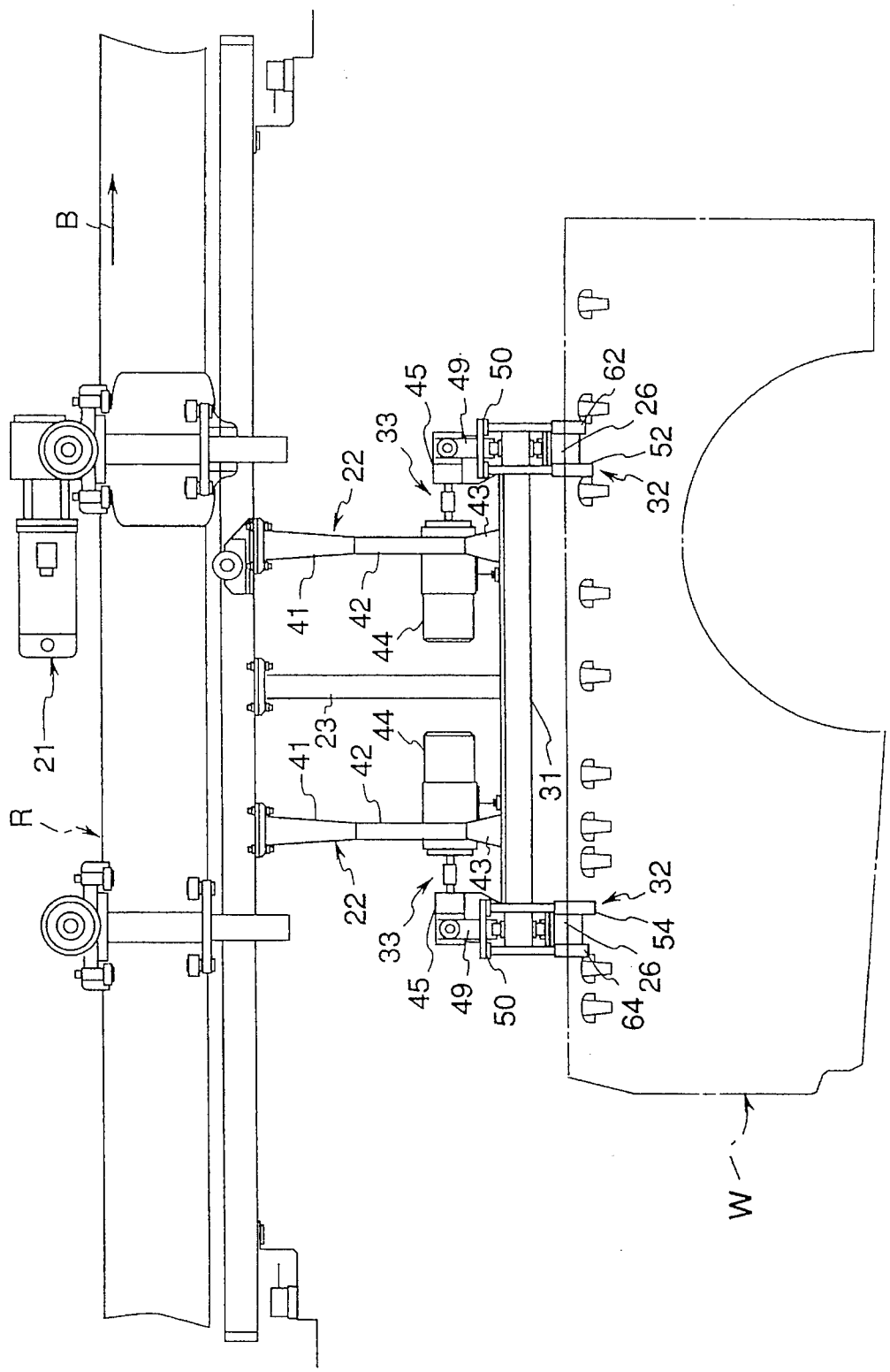
FIG. 2 is a right side view of the carrier shown in FIG. 1.
Figure 3:
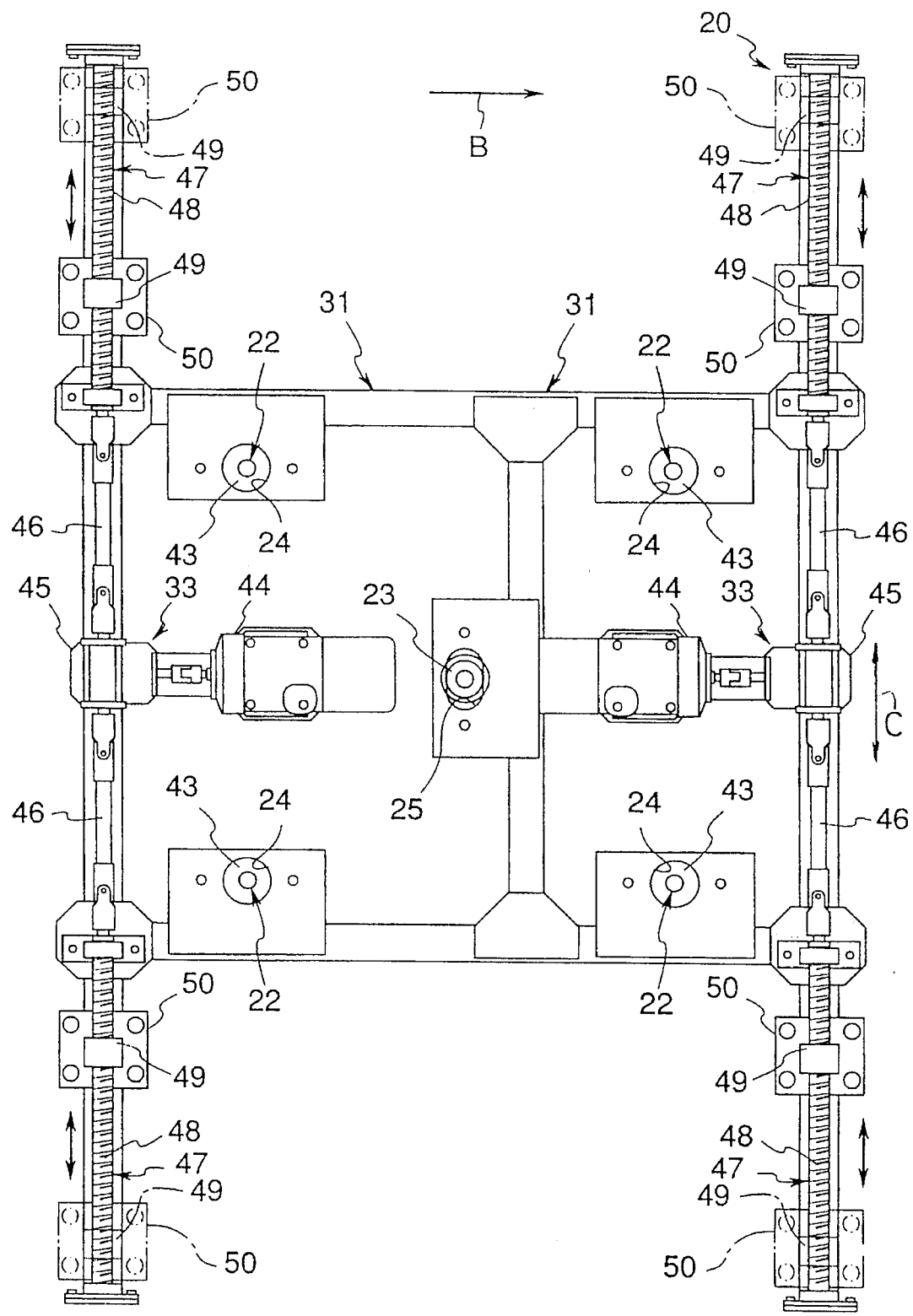
FIG. 3 is a plan view of the carrier shown in FIG. 1.

As shown in FIG. 3, the hanger frame 31 includes four receiving bores 24 for engaging each of the cone portions 43 and a slot 25 for loosely fitting around the regulation rod 23. The slot 25 is formed such that the longitudinal direction thereof (the direction of arrow C as viewed in FIG. 3) is perpendicular to the running direction of the carrier 21 (the direction of arrow B as viewed in FIGS. 2–4) and touches a peripheral surface of the regulation rod 23.

FIG. 3 shows an interval changing device 33, 33 which acts to bring one grip strip (described later) of the gripping elements 32 closer to or farther from each other so that the intervals therebetween can be enlarged or reduced respectively. The interval changing devices 33, 33 are mounted on the hanger frame 31. Each of the interval changing devices 33 include a motor 44, an orthogonal reducer 45, shafts 46, 46, and ball screws 47, 47.

Figure 4:
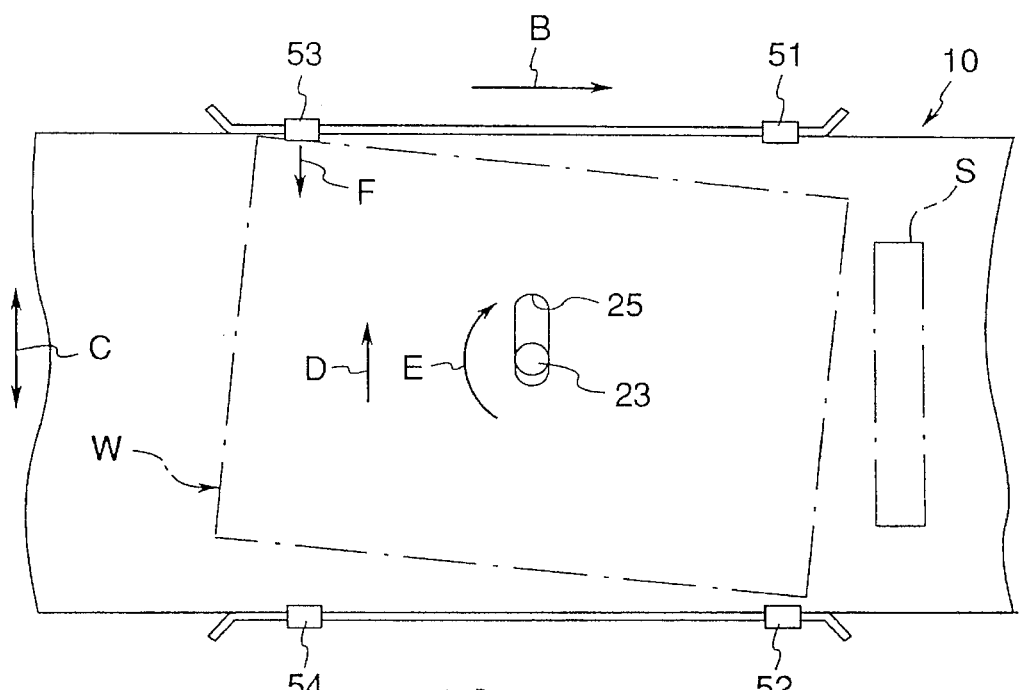
FIG. 4 is an explanatory diagram of the present invention in an operating condition.

A slider 50 is capable of slidably reciprocating in the direction of arrow C as viewed in FIG. 3, and is mounted on a ball nut 49 which is screwed on a screw shaft 48 of the ball screw 47. Each of the sliders 50 as shown in FIG. 1, include outer grip strips 51, 52, 53, and 54 which are facing inward as shown in FIG. 4 for gripping the conveyor goods W from the outside, and inner grip strips 61, 62, 63 (not shown), and 64, which are facing outward as shown in FIGS. 1 and 2, for gripping the conveyor goods W from the inside.

Each of the two grip strips 51 and 52, 53 and 54, 61 and 62 63 and 64 make a pair, respectively, to compose the respective gripping elements 32, wherein the interval therebetween is capable of enlarging and reducing by approaching and distancing from each other.

In operation, the interval changing device 33 works as follows. The rotary force of the motor 44 is transmitted to the screw shaft 48 of the ball screw 47 through the orthogonal reducer 45 and the shaft 46. When the screw shaft 48 rotates, the slider 50 moves on the hanger frame 31, and each of the grip strip 51, 53, 54, 61, 62, 63 and 64 moves in the direction of arrow C perpendicular to the running direction of the carrier 21. In gripping and supporting the conveyor goods W, the rotary direction of the screw shaft 48 is dependent upon whether the inward grip strips 52, 52, 53 and 54 are close to each other or the outward grip strips 61, 62, 63 and 64 are distant from each other.

A sliding member 26, movable in the direction of arrow C, is mounted on the hanger frame 31 at the lower surface thereof as shown in FIG. 1. Each of the four sliding members 26 is mounted right under each of the four screw shafts 48, as shown in FIG. 3.

As shown in FIG. 1, tensile springs 65, 65 are mounted on both sides of the sliding member 26, so that the sliding member 26 is drawn from both sides by the tensile springs 65, 65 and maintained at the predetermined position.

In operation, the hanger 20 works as follows. The carrier 21 stops at the predetermined position right above the position that the conveyor goods W is carried in and makes the gripping elements open. The receiving bore 24 of the hanger frame 31 is engaged with the cone portion 43 of the hanger rod 22 so that the hanger frame 31 is suspended by the hanger rod 22 in a locked condition.

The conveyor goods W are transported to the carry-in position and raised by an elevator (not shown). Assuming that the conveyor goods W, as shown in FIG. 4 having rebounded from the stopper S, the conveyor goods W are carried in at angle 2 and are deviated from the predetermined position.

The conveyor goods W are raised by the elevator until they abut the sliding member 26, push up the hanger frame 31 and raise the receiving bore 24 from the cone portion 43. This results in the hanger frame 31 being placed in a floating condition.

The elevator stops the conveyor goods W from going up, when the receiving bore 31 is lifted from the cone portion 43. In other words, the conveyor goods w stop at the position at which the hanger frame 31 is pushed up to be in a floating condition.

Then, each of the grip strips 51, 52, 53 and 54, mounted on the hanger frame 31, move in to approach each other.

Referring to FIG. 4, the conveyor goods w is placed at an angle to and deviated from the predetermined position so that the grip strip 53 of the upper left hand corner abuts the conveyor goods W. The hanger frame 31 rotates in the direction of arrow E about the regulation rod 23 by the reaction force generated when the grip strip 53 of the upper left hand corner pushes against the conveyor goods W, while moving in the direction of arrow D as guided by the sliding member 26.

While the grip strip 53 of the upper left hand corner is moving in the direction of arrow F, the other grip strips 51, 52 and 54 are also moving in an approaching direction toward the conveyor goods W. Further, the grip strips 51, 52 and 54 are made to approach in the direction of arrow D, of the hanger frame 31, not only by the movement, but also by the rotational motion thereof in the direction of arrow E.

In this way, each of the four grip strips 51, 52, 53 and 54 securely grips the four corners of the conveyor goods W without failing to grip it, so that the hanger 20 can be fixed to the appropriate position of the conveyor goods W.

The hanger frame 31 is allowed to move and rotate relative to the carrier 21 because of both the loose fit of the hanger rod 22 in the receiving bore 24 apart from the cone portion 43 and the engagement of the regulation rod 23 with the slot 25.

When the elevator descends with the hanger frame 31 floating, the conveyor goods W and the hanger frame 31 supported on the elevator descend until the receiving bore 24 is supported by the cone portion 43. At this point, the conveyor goods W and hanger frame 31 stop while the elevator continues to descend and stops at the height at which it can lift the following conveyor W to be transported.

Figure 5:
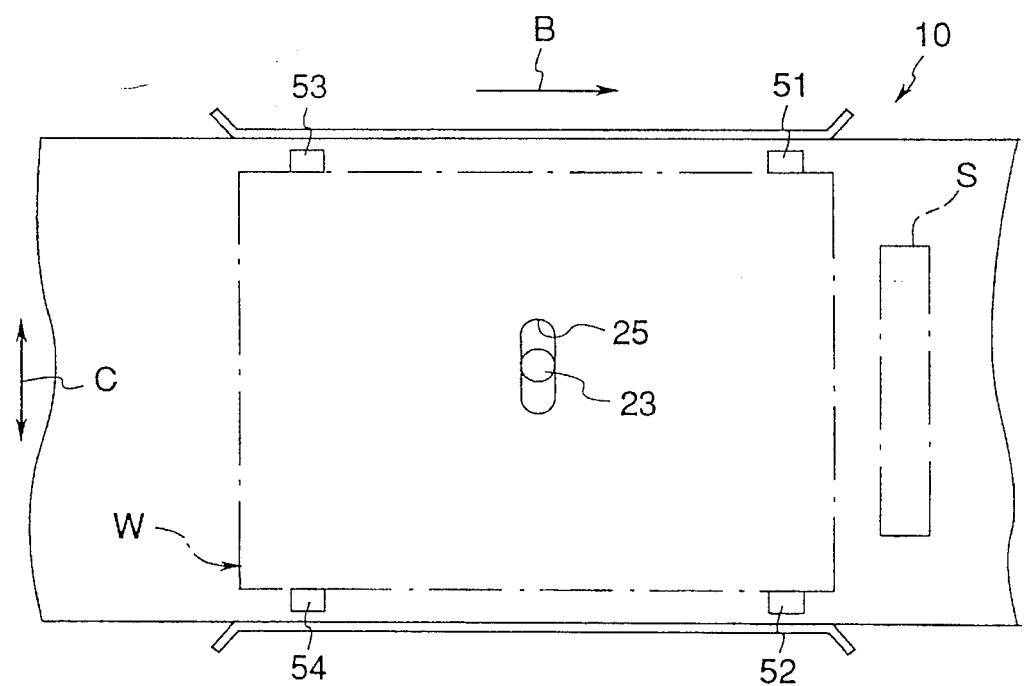
FIG. 5 is an explanatory diagram of the present invention in an operating condition.
Figure 6:
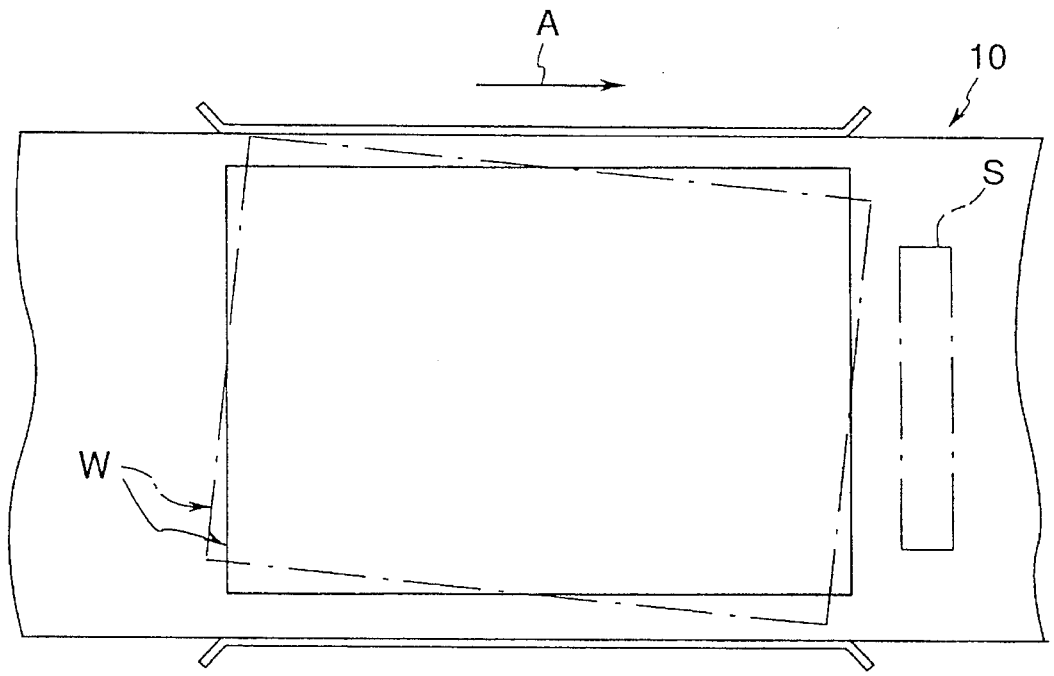
FIG. 6 is an explanatory diagram of a conventional hanger in an operating condition.

When the receiving bore 24 of the hanger frame 31 is caught by the cone portion 43 and the descent of the hanger frame 31 is stopped, the receiving bore 24, guided by a circular cone, corrects the position deviation of the hanger frame 31 so that the receiving bore 24 is centered on the predetermined position. Accordingly, the hanger 20 is positioned with respect to the carrier As will be apparent from the foregoing, the conveyor goods W is suspended such that the position deviation with respect to the carrier 21, in the direction of arrow C, i.e., the moving direction of the sliding member 26 and longitudinal direction of the slot 25, is corrected as shown in FIG. 5. Thereafter, the conveyor goods W are transported to the discharge place and discharged with precision.

In the foregoing hanger 20, the moving directions of the gripping elements 32, the slider 50 and the sliding member 26, as well as the longitudinal direction of the slot 25 as applied to the direction of arrow C are al as by example. However, the present invention is not limited thereto and the foregoing directions may be obviously applied to other directions, for example, the running direction of the carrier 21 (in the direction of arrow B), thereby gripping the conveyor goods W to correct the position deviation in that direction. In that case, the conveyor goods W are suspended such that the position deviation in the running direction of the carrier 21 is corrected.

As will be understood from the foregoing, according to the apparatus for positioning a floating hanger of the present invention, the hanger frame in a floating condition, supported by the gripping elements, is made to move by a sliding member and rotate about the regulation rod so that the hanger frame is positioned to be ready to hang the conveyor goods. Then, the conveyor goods are supported by the gripping elements and the hanger frame descends, so that the floating hanger frame, guided by the circular cone of the hanger rod, can be centered at the predetermined position with respect to the carrier which stops at the predetermined position. In this way, even if the carry-in position of the conveyor goods is deviated, the conveyor goods are not only suspended by the hanger such that the position deviation can be corrected, but also discharged correctly to the predetermined position.

Further, when the hanger frame grips the conveyor goods in a floating condition, the hanger frame rotates about the regulation rod and the gripping elements are certainly made to face the conveyor goods. Accordingly, the gripping elements would never fail to grip the conveyor goods even though the carry-in position is deviated, The terms and expression which have been employed herein are used as terms of description and not of limitation, and there is no intent, in the use of such terms and expressions, of excluding any of the equivalents of the features shown and described or portions thereof, but it is recognized that various modifications are possible within the scope of the invention claimed.

What is claimed is:

1. An apparatus for positioning a floating hanger, comprising:

a hangar rod elongated vertically and mounted on a carrier which runs on a rail, said hanger rod having a cone portion formed at a lower end thereof;

a hanger frame hung from said hanger rod;

a plurality of grip means mounted on said hanger frame for gripping conveyor goods, said grip means being movable with respect to each other such that spacing therebetween may be changed;

a receiving bore formed through a plate attached to said hanger frame for engaging a circular cone of said cone portion therewith such that said hanger rod is loosely fitted into said hanger frame;

a regulation rod mounted on said carrier and elongated downward therefrom;

a slot formed through a plate attached to said hanger frame for allowing said regulation rod to pass therethrough, wherein said slot abuts an outer periphery of said regulation rod thereby allowing said hanger frame to translate only in a single direction and to rotate about said regulation rod in a horizontal plane; and a sliding member mounted on a lower surface of said hanger frame and being translatable in said single direction, said sliding member abutting said conveyor goods once said conveyor goods are lifted up by said hanger frame.

* * * * *